US012623941B2

(12) United States Patent
Suhett De Souza et al.

(10) Patent No.: US 12,623,941 B2
(45) Date of Patent: May 12, 2026

(54) METHOD FOR REMOVING AMMONIACAL NITROGEN FROM HYPERSALINE EFFLUENTS THROUGH A CONSORTIUM CONTAINING HIGH-SALINITY-RESISTANT HETEROTROPHIC NITRIFYING AND AEROBIC DENITRIFYING MICROORGANISMS

(71) Applicants: PETRÓLEO BRASILEIRO S.A.—PETROBRAS, Rio de Janeiro (BR); UNIVERSIDADE FEDERAL DE VIÇOSA (UFV), Viçosa (BR)

(72) Inventors: Rodrigo Suhett De Souza, Rio de Janeiro (BR); Haline Bachmann Pinto, Rio de Janeiro (BR); Maira Paula De Sousa, Rio de Janeiro (BR); Larissa Quartaroli, Viçosa (BR); Cynthia Canedo Da Silva, Viçosa (BR); Lívia Carneiro Fidélis Silva, Viçosa (BR); Ricardo De Araujo Cid Da Silva, Rio de Janeiro (BR)

(73) Assignees: PETRÓLEO BRASILEIRO S.A.—PETROBRAS, Rio de Janeiro (BR); UNIVERSIDADE FEDERAL DE VIÇOSA (UFV), Viçosa (BR)

( * ) Notice: Subject to any disclaimer, the term of this patent is extended or adjusted under 35 U.S.C. 154(b) by 379 days.

(21) Appl. No.: 18/447,214

(22) Filed: Aug. 9, 2023

(65) Prior Publication Data

US 2024/0051858 A1 Feb. 15, 2024

(30) Foreign Application Priority Data

Aug. 10, 2022 (BR) ...................... 10 2022 015797 9

(51) Int. Cl.
*C02F 3/34* (2023.01)
*C02F 3/12* (2023.01)
(Continued)

(52) U.S. Cl.
CPC ............ *C02F 3/341* (2013.01); *C02F 3/1205* (2013.01); *C02F 3/302* (2013.01); *C02F 3/34* (2013.01);
(Continued)

(58) Field of Classification Search
CPC ........ C02F 3/341; C02F 3/1205; C02F 3/302; C02F 3/34; C02F 2101/16; C02F 2103/10;
(Continued)

(56) References Cited

U.S. PATENT DOCUMENTS

2011/0010475 A1    1/2011   Wahlmann et al.
2015/0076060 A1*   3/2015   Lee ......................... C02F 3/307
                                                            210/150

FOREIGN PATENT DOCUMENTS

CN         101985376 A  *  3/2011   ................ C02F 3/34
CN         102703350       10/2012
(Continued)

OTHER PUBLICATIONS

Machine-generated English translation of CN 101985376, generated on Oct. 24, 2025.*
(Continued)

*Primary Examiner* — Fred Prince
(74) *Attorney, Agent, or Firm* — Knobbe, Martens, Olson & Bear, LLP

(57) ABSTRACT

The invention discloses a method to provide a consortium containing heterotrophic nitrifying and aerobic denitrifying microorganisms from an activated sludge originating from effluent treatment plants. The microbial consortium is
(Continued)

capable of removing ammoniacal nitrogen from substrates with high salinity with superior efficiency. Thus, the microbial consortium from the described method can be applied to purify hypersaline effluents contaminated with nitrogen. Therefore, the use of the microorganism consortium provided to remove ammoniacal nitrogen from hypersaline effluents and a method therefor are also part of the scope of the invention.

7 Claims, 1 Drawing Sheet

(51) Int. Cl.

| | | |
|---|---|---|
| *C02F 3/30* | (2023.01) | |
| *C02F 101/16* | (2006.01) | |
| *C02F 103/10* | (2006.01) | |

(52) U.S. Cl.
CPC ...... *C02F 2101/16* (2013.01); *C02F 2103/10* (2013.01); *C02F 2209/02* (2013.01); *C02F 2209/05* (2013.01); *C02F 2209/06* (2013.01); *C02F 2209/07* (2013.01); *C02F 2209/08* (2013.01); *C02F 2209/14* (2013.01); *C02F 2209/18* (2013.01); *C02F 2209/20* (2013.01); *C02F 2305/06* (2013.01)

(58) Field of Classification Search
CPC .............. C02F 2209/02; C02F 2209/05; C02F 2209/06; C02F 2209/07; C02F 2209/08; C02F 2209/14; C02F 2209/18; C02F 2209/20; C02F 2305/06
USPC ................................................. 210/611, 903
See application file for complete search history.

(56) References Cited

FOREIGN PATENT DOCUMENTS

| CN | 103074286 | | | 5/2013 | | |
|---|---|---|---|---|---|---|
| CN | 105645582 | A | * | 6/2016 | | |
| CN | 108070543 | A | * | 5/2018 | .............. | C02F 3/348 |
| CN | 103074285 | | | 5/2023 | | |
| CN | 117947125 | A | * | 4/2024 | .......... | C07D 239/06 |
| EP | 2 631 219 | | | 8/2013 | | |

OTHER PUBLICATIONS

Machine-generated English translation of CN 117947125, generated on Oct. 24, 2025.*
Machine-generated English translation of CN 105645582, generated on Oct. 24, 2025.*
Machine-generated English translation of CN 108070543, generated on Oct. 24, 2025.*
Da Motta et al., 2003, Monitoring filamentous bulking in activated sludge systems fed by synthetic or municipal wastewater, Bioprocess Biosyst Eng., 25:387-393.
Hammer et al., 2001, Past: Paleontological statistics software package for education and data analysis Palaeontol. Electron., 4(1): article 4, 9 pp.
Lefebvre et al., 2006, Treatment of organic pollution in industrial saline wastewater: a literature review, Water Research, 40:3671-3682.
Marazioti et al., 2003, Kinetic modeling of a mixed culture of Pseudomonas denitrificans and Bacillus subtilis under aerobic and anoxic operating conditions, Water Research, 37:1239-1251.
Matsuzaka et al., 2003, A Simple Screening Procedure for Heterotrophic Nitrifying Bacteria with Oxygen-Tolerant Denitrification Activity. Journal of Bioscience and Bioengineering, 95(4):409-411.
Robertson et al., 1983, *Thiosphaera pantotropha* gen. nov., sp. nov., a facultatively anaerobic, facultatively autotrophic sulfur bacterium, Journal of General Microbiology, 129:2847-2855.
Silva et al., 2010, Investigation of bacterial diversity in membrane bioreactor and conventional activated sludge processes from petroleum refineries using phylogenetic and statistical approaches, J. Microbiol. Biotechnol., 20(3):447-459.
Silva et al., 2018, Effect of salinity in heterotrophic nitrification/aerobic denitrification performed by acclimated microbiota from oil produced water biological treatment system, International Biodeterioration & Biodegradation, 130:1-7.
Silva et al., 2019, Heterotrophic nitrifying/aerobic denitrifying bacteria: Ammonium removal under different physical-chemical conditions and molecular characterization, Journal of Environmental Management, 248:109294.
Third et al., 2005, Long-term aeration management for improved N-removal via SND in a sequencing batch reactor, Water Research, 39:3523-3530.

* cited by examiner

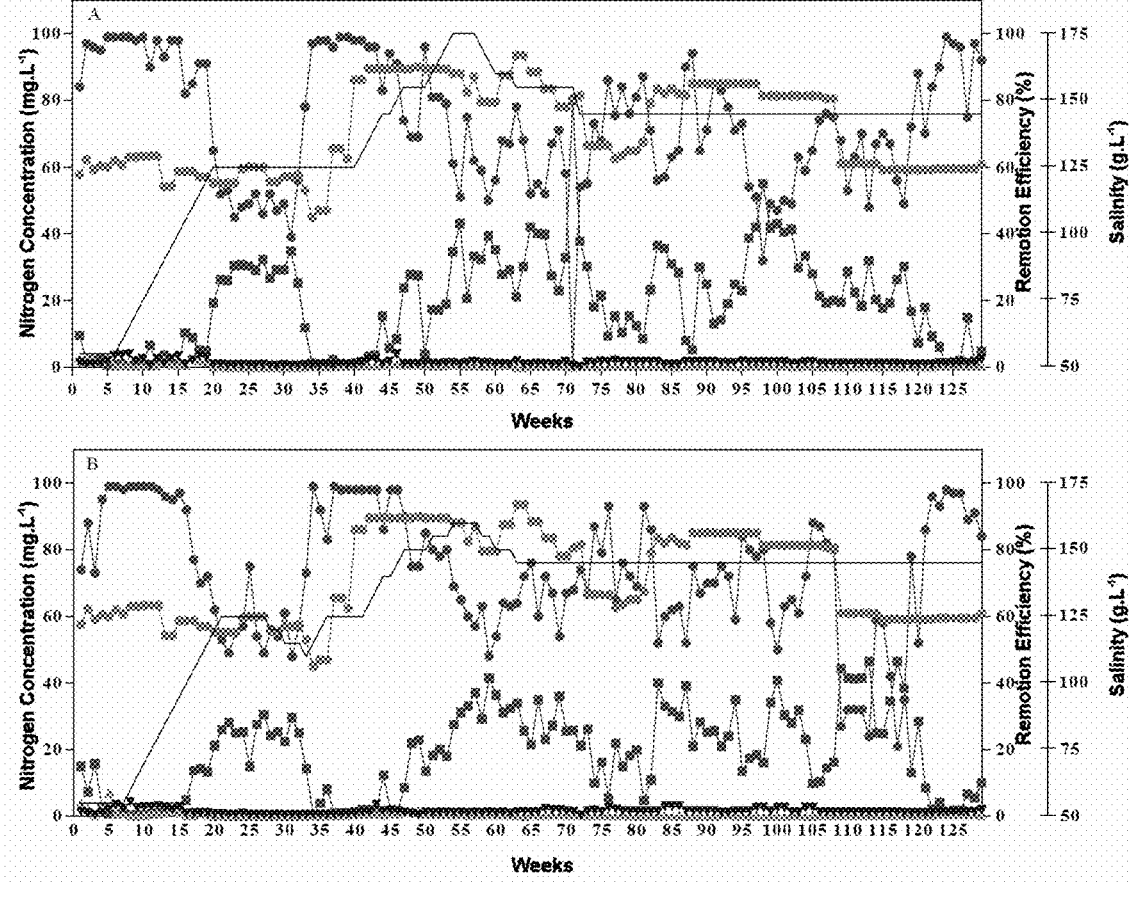

1

METHOD FOR REMOVING AMMONIACAL NITROGEN FROM HYPERSALINE EFFLUENTS THROUGH A CONSORTIUM CONTAINING HIGH-SALINITY-RESISTANT HETEROTROPHIC NITRIFYING AND AEROBIC DENITRIFYING MICROORGANISMS

FIELD OF THE INVENTION

The present invention pertains to the field of treatment of water, wastewater, sewage or muds and sludge. In particular, the invention fits the treatment of wastewater, particularly hypersaline effluents, contaminated with nitrogen compounds.

BACKGROUND OF THE INVENTION

During the process of extracting and processing oil, a large volume of water is consumed, with a high ratio of volume of water used per volume of oil processed. There is a large amount of water associated with the oil extracted, the so-called production water, which needs to be separated before the oil is distributed to the refineries. This water basically consists of a mixture of formation water, which is naturally present in the geological formation of the oil reservoir, and water injected into the reservoir for secondary oil recovery.

The production water is transported to the surface along with the oil. Its composition is complex, containing in addition to carbonaceous compounds, heavy metals, dissolved solids and ions in solution with varying concentrations, such as chloride, sodium, calcium, magnesium, sulfide and ammonia.

The characteristics of production water vary according to the geographic location of the exploration well, depth, geological formation, chemical composition of the extracted oil, chemicals used in the extraction and age of the exploration field.

Wastewaters containing high concentrations of ammoniacal nitrogen can be toxic to aquatic life, cause eutrophication and oxygen depletion in the environment, negatively affecting water quality and aquatic microbiota. In this way, in accordance with environmental requirements, production water, before being discharged into the receiving body or being reused in the extraction process, must be treated.

The treatment of production water occurs by physical, chemical, biological methods or by combinations of the same. The biological process has been widely used to remove ammoniacal nitrogen in non-saline effluents, mainly because of its lower cost. However, the presence of salt in effluent treatment plants is a limiting factor for biological water treatment processes, since salinity tends to affect the metabolic activity of microorganisms, reducing their growth and the oxidation rates of ammoniacal nitrogen.

With the increase in oil exploration in the pre-salt layer in Brazil, the treatment processes of production water will face effluents with increasingly high salinity levels, which may limit the treatment with biological purification processes. Given this scenario, ensuring the biological treatment process of production water in conditions of high salinity is a challenge.

Accordingly, the adaptation of the microbiota and the identification of parameters that allow the development of operational procedures to maintain the removal of ammonia in saline and hypersaline effluent treatment systems are necessary for the use of biological treatment processes for production water within the adjustment of the ammoniacal nitrogen concentration of such effluent to the levels acceptable by current legislation.

Among the biological processes applied to the treatment of production water, the batch activated sludge system has stood out in Brazil, in treatment plants consisting of the following units: storage tank, flotation unit, equalization tank, sequential batch biological reactors, coagulation/flocculation unit, high-rate clarifier and sand filter.

Currently, the production water that arrives at the production water treatment plants has an approximate salinity of $55 \ g \cdot L^{-1}$ of NaCl, which can limit its treatment via biological processes.

In this sense, there are some studies aiming at the removal of certain polluting compounds in high salinity, such as those described below.

EP 2631219A1 describes a method for reducing total organic carbon in hypersaline water. US 2011010475A1 presents a treatment process for wastewater from oil fields (hypersaline wastewater) for degradation of hydrocarbons present in this type of effluent, through the addition of a consortium of isolated halophilic microorganisms. Both documents report ammoniacal nitrogen removal processes at salinity levels of up to 150 g/L, but always in synthetic effluents.

In the present invention, the biological removal process of ammoniacal nitrogen from hypersaline effluents takes place through heterotrophic nitrifying/aerobic denitrifying microorganisms (HN/AD). When compared to the conventional ammonia removal process, which is based on the operational requirements for autotrophic nitrification, HN/AD processes present several advantages for effluent treatment plants.

Ammoniacal nitrogen purification protocols with HN/AD microorganisms have the additional advantage of using an organic substrate. With this, it is possible to remove, in addition to ammonia, the contaminating organic matter from the effluent. Also, HN/AD microorganisms are tolerant to oxygen in both the nitrification and denitrification steps and, therefore, the same microorganism performs the entire process.

Accordingly, the complete removal of ammoniacal nitrogen through HN/AD microorganisms occurs in reactors operated in the same atmospheric condition, which may favor the reduction of the physical space necessary for the construction of treatment plants. In addition, the ammonia removal process is simplified, since the alkalinity generated by the denitrification process is able to balance the acidification caused by nitrification and, therefore, the addition of alkaline agents may not be necessary. (Matsuzaka, E., Nomura, N., Nakajima-Kambe, T., Okada, N., Nakahara, T. (2003) A Simple Screening Procedure for Heterotrophic Nitrifying Bacteria with Oxygen-Tolerant Denitrification Activity. Journal of Bioscience and Bioengineering, 95 (4), 409-411.; Robertson, L. A., Kuenen, J. G. (1983) *Thiosphaera pantotropha* gen. nov., sp. nov., a facultatively anaerobic, facultatively autotrophic sulfur bacterium. Journal of General Microbiology, 129, 2847-2855.; Marazioti, C., Kornaros, M., Lyberatos, G. (2003) Kinetic modeling of a mixed culture of *Pseudomonas denitrificans* and *Bacillus subtilis* under aerobic and anoxic operating conditions. Water Research. 37, 1239-1251.; Third, K. A., Gibbs, B., Newland, M., Cord-Ruwisch, R. (2005) Long-term aeration management for improved N-removal via SND in a sequencing batch reactor. Water Research, 39, 3523-3530.; Silva, L. C. F., Lima, H. S., de Oliveira Mendes, T. A., Sartoratto, A., de Paula Sousa, M., de Souza, R. S., da Silva, C. C. (2019). Heterotrophic nitrifying/aerobic denitrifying bacteria: Ammonium removal under different physical-chemical conditions and molecular characterization. Journal of Environmental Management, 248, 109294).

The paper by Silva et al. (SILVA, L. C. F. et al. Effect of salinity in heterotrophic nitrification/aerobic denitrification performed by acclimated microbiota from oil produced water biological treatment system. International Biodeterioration & Biodegradation, v. 130, p. 1-7, 2018.) discloses that the process of acclimatization is important and essential for ammonia removal to occur at high salinities. However, the acclimatization of the microbiota to salt was carried out in a culture medium and not in the effluent itself and, moreover, the culture medium was adapted to halophilic and moderate halophilic microorganisms (R2A and MOD), and not to nitrifying microorganisms. The microbial consortia in Silva et al. were only able to remove ammonia in much longer than 24 hours, and the removal efficiency was 40% at 20% salinity.

Documents CN102703350, CN103074285 and CN103074286 describe the isolation of bacteria *Bacillus altitudinis*, *Brachybacterium* and *Salinivibrio*, respectively, and their use in heterotrophic nitrification and aerobic denitrification processes of various hypersaline aqueous effluents. The conditions of pH, temperature and carbon/nitrogen ratio of the bacterial sludge that most favor the removal of ammonia from effluents with salinity of up to 13% are taught. However, the three mentioned inventions are practiced in culture media, in which pH, temperature and Carbon/Nitrogen ratio are kept fixed and are optimized for each of the isolated bacterial genera (i.e., *Bacillus, Brachybacterium* and *Salinivibrio*).

The present invention differs from the state of the art of the papers mentioned above by working with a bacterial consortium—which is more resilient to load shocks and changing operational parameters than pure cultures—in addition to conducting the acclimatization of bacteria in the effluent itself, in which the conditions of pH and C/N ratio, for example, are not fixed (as in culture media).

With the adoption of the process for obtaining a microbial community in an unprecedented way presented herein, as well as with the optimized operating parameters described herein, it was possible to increase the removal of ammoniacal nitrogen at salinities greater than 140 g·L$^{-1}$ of NaCl, at residual concentrations of ammoniacal nitrogen concentrations lower than 20 mg·L$^{-1}$, that is, at concentrations acceptable by Brazilian legislation. Without favoring this process, the removal of ammoniacal nitrogen was only achieved up to 130 g·L$^{-1}$ of salinity. Furthermore, it was possible to achieve a removal of 79% of ammoniacal nitrogen in salt concentrations of up to 170 g·L$^{-1}$ of NaCl.

The processes for obtaining a microbial community resistant to high salinities and removing ammonia in hypersaline conditions, as described below, can be applied in all industries that require biological treatment of effluents, not just the oil industry.

SUMMARY OF THE INVENTION

The invention described herein comprises a method for removing ammoniacal nitrogen from hypersaline effluents through a consortium of heterotrophic nitrifying and aerobic denitrifying (HN/AD) microorganisms resistant to high salinity. The method comprises at least the steps of:
   a) supplying an activated sludge from a biological treatment plant for an effluent;

b) providing a hypersaline aqueous effluent with salinity similar to activated sludge from an effluent treatment plant;
   c) inoculating a reactor with the aforementioned activated sludge of item (a) and the hypersaline aqueous effluent of item (b) in a proportion ranging from 70:30 to 50:50;
   d) feeding/aerating the activated sludge for 4 h, aerating for 3 h, allowing to settle for 1 h and discarding the supernatant for 4 h;
   e) discarding 30% of the supernatant and completing the reactor volume with the effluent of item (b);
   f) weekly increasing the salinity of the effluent of item (b) with the addition of NaCl in the range of 5 g/L until nitrification is inhibited, that is, when the residual ammoniacal nitrogen is greater than 20 mg·L$^{-1}$;
   g) at salinities lower than 100 g·L$^{-1}$, adding a source of carbon to the effluent of item (b) in order to ensure a minimum ratio of COD:NH$_4^+$ from 20:1 to 40:1; or, at salinities greater than 100 g·L$^{-1}$, maintaining the C:N ratio, measured as Total Organic Carbon (TOC)/NH$_4^+$, between 4 and 7,
   h) maintaining a phosphorus source at a minimum NH$_4^+$/P ratio of 5, wherein the alkalinity of the effluent of item (b) is maintained above 900 mg/L, the pH is maintained between 6.5 and 7.5 and the temperature is maintained between 27 and 33° C.

In certain aspects, the method to obtain a consortium containing HN/AD microorganisms resistant to high salinity is practiced with an activated sludge from a production water treatment plant derived from oil exploration.

In certain aspects of the method for removing ammoniacal nitrogen from hypersaline effluents, the effluent of interest is production water derived from oil exploration.

In certain aspects of the method for removing ammoniacal nitrogen from hypersaline effluents, the carbon source is ethanol and the phosphate source is sodium tripolyphosphate.

In certain aspects of the method for providing a consortium containing HN/AD microorganisms resistant to high salinity, the salinity of the effluent of interest is greater than or equal to 50 g·L$^{-1}$.

In certain aspects of the invention, the consortium containing HN/AD microorganisms resistant to high salinity is capable of removing ammoniacal nitrogen from a hypersaline effluent with salinity greater than or equal to 50 g·L$^{-1}$.

Finally, in another aspect of the invention, the method for removing ammoniacal nitrogen from effluents with high salinity addresses to the purification of production water from oil production.

BRIEF DESCRIPTION OF THE DRAWING

FIG. 1 shows the concentrations of nitrogen compounds and the efficiency of ammoniacal nitrogen removal in bioreactors R1 (A) and R2 (B) at different salinities, through analytical monitoring of salinity, ammoniacal nitrogen (raw and treated effluent), nitrate, nitrite and removal efficiency.

DETAILED DESCRIPTION OF THE INVENTION

The production water generated in the oil extraction process is basically formed by the combination of formation water, which is naturally present in oil reservoirs, and injection water, which is injected with the addition of adjuvants necessary to carry out the extraction. For each barrel of oil extracted, around 246 to 340 liters of effluent are generated to be treated. This production water has a complex composition, containing organic matter and several contaminants that can be toxic to the environment, particularly ammonia.

Currently, there are different technologies applied to the treatment of effluents, such as flocculation, flotation, activated sludge, membrane filtration, among others. The choice of used technology depends on the type of effluent to be treated and the contaminant to be purified. In the case of production water generated by the oil extraction process, the biological treatment using activated sludge is an option of interest, as it offers lower operating costs and allows the removal of organic matter and nutrients (Da Motta et al., 2003; Lefebvre and Moletta, 2006).

Isolated heterotrophic nitrifying and aerobic denitrifying microorganisms present in activated sludge can provide relevant advantages to the treatment of effluents with a high content of organic matter and ammonia. Such microorganisms use organic substrate and, therefore, simultaneously remove both types of contaminants from the effluent. However, the high salinity can reduce the viability of the microbiota, thus decreasing the rate of ammoniacal nitrogen purification.

The present invention discloses a method to obtain a microbial consortium capable of performing heterotrophic nitrification and aerobic denitrification (HN/AD) in aqueous effluents with high salinity. Further, there are encompassed by the scope of the invention, the use of said microbial consortium in a method for removing ammoniacal nitrogen from an aqueous effluent and a biological method for removing ammoniacal nitrogen from hypersaline aqueous effluents, particularly production waters from the exploration oil.

Definitions

In the context of the present invention, the term "heterotrophic nitrification" denotes a process of oxidation of ammonia/ammonium ($NH_3/NH_4^+$) to nitrate ($NO_3^-$), carried out by a microorganism, without energy production. Aerobic denitrification denotes the phenomenon of transformation of nitrates and other substances into nitrogen gas ($N_2$), by microorganisms, in the presence of oxygen.

Microbial consortia are groups of microorganisms, mainly bacteria and fungi, acting together for the degradation of a matter. Microbial consortia in the context of the present invention are preferably consortia of bacteria from the activated sludge of a production water treatment plant derived from oil exploration.

In the context of the invention, the expression "activated sludge" refers to the sludge resulting from an effluent treatment process intended for the destruction of biodegradable pollutants present in wastewater and/or sewage.

Throughout the present application, the expression "ammoniacal nitrogen" is used to reflect the amount of ammonia in waste products, such as effluents. The expression is widely used in waste treatment and water purification systems. Ammoniacal nitrogen values in wastewater or waste liquids are measured in milligrams per liter and are used to specify water treatment systems and facilities.

According to the invention, "hypersaline wastewaters", "hypersaline effluents", "effluents with high salinity" and similar expressions denote effluents in which the NaCl concentration is greater than or equal to 5% (w/v).

In one aspect of the invention, the method for obtaining consortium of HN/AD microorganisms resistant to high salinity of the present invention is practiced on a sample of activated sludge from aqueous effluent treatment plants.

Activated sludge can come from different sources, including, but not limited to, treatment plants of sewage, industrial wastewater and production water derived from oil exploration.

The activated sludge is acclimatized in appropriate reactors and in conditions of increasing salinity. The reactors can be, for example, aerated bioreactors, with a useful volume of 0.85 liters, operated in sequential batch. After sedimentation, about 18% of the supernatant (150 mL) is removed and the volume completed with crude effluent. The feeding of the bioreactors is carried out with the aid of a peristaltic pump and the disposal of the supernatant through a solenoid valve, both connected to timers. Dissolved oxygen levels in bioreactors must be maintained above 2 $mg \cdot L^{-1}$, through, for example, aeration by air pump and diffusers located at the bottom of the reactors. The salinity can be modulated with the addition of 2 to 10 $g \cdot L^{-1}$ of NaCl, until the salt concentration in the medium inhibits the ammonia removal process.

During acclimatization, the bioreactors can be operated in cycles that comprise steps of feeding, aeration, sedimentation and disposal. The feeding step with aeration can preferably last about 4 hours; the aeration step can preferably last about 3 hours; the sedimentation step can preferably last about 1 hour; and the discard step may preferably last about 4 hours. Each cycle can last, for example, 12 hours.

To favor the selection and prevalence of metabolism of HN/AD microorganisms, temperature, pH and proportion of carbon, nitrogen and phosphorus available in the reactor environment were kept stable. The temperature can be any between 27 and 33° C., preferably 30° C. The pH can be any between 6.5 and 7.5, preferably 7.0. The technician skilled on the subject knows that it is possible to adjust the pH of a solution by adding acidic components, such as, for example, $H_2SO_4$, or basic components, such as, for example, NaOH.

The ratio of carbon to nitrogen (C/N), when measured in the form of chemical oxygen demand (COD) and ammoniacal nitrogen ($NH_4^+$) can be any between 20 and 40; if measured in the form of total organic carbon (TOC)/$NH_4^+$, then the C/N ratio can be any between 4 and 7. The technician skilled on the subject will recognize that he/she can supplement the reaction with ethanol as a carbon source to achieve the C/N ratio desired.

The ratio between nitrogen and phosphorus available in the medium, with nitrogen measured in the form of ammoniacal nitrogen ($NH_4^+$) ($NH_4^+$:P), can assume different figures, but will preferably be 5:1. In addition to carbon supplementation, the medium can be supplemented with various compounds that function as sources of phosphorus. It will be apparent to the technician skilled on the subject that phosphorus supplementation can be promoted through the addition of a range of phosphorus salts including, but not limited to, for example, sodium tripolyphosphate ($Na_5P_3O_{10}$) and monobasic potassium phosphate ($KH_2PO_4$).

In another aspect of the invention, the consortium of HN/AD microorganisms of the method described herein is capable of removing ammoniacal nitrogen from hypersaline effluents. Under certain circumstances, hypersaline effluent may be derived from sewage, industrial activity or oil exploration. In the latter case, the effluent is then production water.

Accordingly, a conclusive aspect of the invention concerns a method for removing ammoniacal nitrogen from hypersaline effluents. In this method, the consortium of HN/AD microorganisms resistant to high salinity and a hypersaline aqueous effluent are maintained in a reactor under specific conditions of controlled pH, temperature and C:N:P ratio.

A technician skilled on the subject will recognize which hypersaline effluents require ammoniacal nitrogen purification. Among the many, a particular object of the present method is the production waters derived from oil exploration, which may have a salinity greater than 100 $g \cdot L^{-1}$. However, as already evident, the consortium of HN/AD microorganisms resistant to high salinity of the present invention can remove nitrogen from effluents with high efficiency in salt concentrations greater than 100 $g \cdot L^{-1}$, reaching up to 170 $g \cdot L^{-1}$. In order for the observed ammoniacal nitrogen purification efficiency to be achieved, the consortium of HN/AD microorganisms and the hypersaline aqueous effluent must be in the reactor in proportions that vary between 50:50 and 70:30.

Finally, the effluent must be supplemented with a source of phosphorus, ensuring a minimum ratio of ammoniacal nitrogen $NH_4^+$:P of 5. When the salinity of the effluent is less than 100 $g \cdot L^{-1}$, the reaction will need supplementation with a source of—carbon, in order to ensure a minimum COD: $NH_4^+$ ratio of 20:1. At salinities greater than 100 $g \cdot L^{-1}$, the C/N ratio, measured as Total Organic Carbon (TOC)/$NH_4^+$, can be maintained between 4 and 7. The alkalinity of the medium inside the reactor must not be less than 900 $mg \cdot L^{-1}$ and the temperature will be 30° C. Alkalinity can be corrected with sodium bicarbonate ($NaHCO_3$) supplementation.

A technician skilled on the subject will recognize that there are several ways to measure the demand for carbon in the mixture, either in the form of COD or in the form of TOC. For example, following the standard procedures of the "Standard Methods for the Examination of Water and Wastewater", methods 5220 D and 5310 B, respectively (APHA, 2005).

There follow below are experiments illustrating the embodiments of the invention, which, as a technician skilled on the subject will understand, are only examples of how the invention can be practiced and should not limit the scope achieved by the inventive concept described herein.

EXAMPLES

Example 1: Obtaining HN/AD Microbial Consortium and Denitrification of Production Water A) Acclimatization of the Sludge 50% v/v of sludge from a biological treatment of production water was inoculated in two reactors (R1 and R2) with a useful volume of 0.85 L, operated in sequential batch with 12-hour cycles with the following phases: (i) feeding/aeration (for 4 hours), (ii) aeration (for 3 hours), (iii) sedimentation (for 1 hour) and (iv) disposal of the supernatant (for 4 hours). The pH of the reactors was maintained within the range of 6.5 to 7.5, with the addition of $H_2SO_4$ or NaOH. The room temperature was maintained around 30° C. and the dissolved oxygen level was maintained above 2 $mg \cdot L^{-1}$ by means of aeration using an air pump and diffusers located at the bottom of the reactors.

In the feeding/aeration step, a peristaltic pump was turned on (by means of a timer) and pumped raw effluent into the reactor. The pump worked with a flow rate of 0.625 mL/min. At the end of the 4 hours, the pump was turned off by the timer. Simultaneously, the air pump was turned on along with the peristaltic pump, and remained on for a period of 7 hours. At the end of 7 hours, the air pump was turned off (timer). With the air pump turned off, the system entered the sedimentation step, for a period of 1 h. After this period, a solenoid valve, positioned at the correct height of the reactor, was activated (also by a timer). When opening the supernatant effluent (treated), it was discarded. The valve remained open for a period of 4 hours. After closing the valve, a new cycle begins.

After the sedimentation step, about 18% of the supernatant (150 mL) was removed and the volume completed with the crude effluent. The effluent was enriched with a source of phosphorus (sodium tripolyphosphate, 14.5 $g \cdot L^{-1}$ solution) and carbon (100% ethanol) to ensure a minimum COD:$NH_4^+$:P ratio of 100:5:1 or COT:$NH_4^+$:P from 20:5:1. Alkalinity was maintained above 900 $mg \cdot L^{-1}$ by adding, when necessary, sodium bicarbonate ($NaHCO_3$) to the produced water. After stabilization of the removal of ammoniacal nitrogen at a residual concentration below 20 $mg \cdot L^{-1}$, 5 $g \cdot L^{-1}$ of NaCl were added weekly to the reactor feed effluent, until 170 $g \cdot L^{-1}$ of NaCl was reached with removal above 79% ammoniacal nitrogen (FIG. 1). After 100 $g \cdot L^{-1}$ of salinity, the C/N ratio (measured as COD/$NH_4^+$) was maintained at 32. When measured as TOC/$NH_4^+$, the C/N ratio was maintained between 4 and 7. The pH was maintained between 6.5 and 7.5 by adding $H_2SO_4$ or NaOH, when necessary, and the temperature was maintained at 30° C. The nitrogen concentration in the production water ranged from 60 to 100 $mg \cdot L^{-1}$.

B) Characterization of the Microbial Diversity

Samples of sludge from the bioreactors, R1 and R2, were collected, performed the extraction of total DNA and subjected to sequencing of the RNA16S region and analysis of microbial diversity. The extraction of total DNA from the microbial community was performed according to the protocol described by Silva et al. (Silva, C. C., Jeus, E. C., Tones, A. P. R., Sousa, M. P., Santiago, V. M. J., Oliveira, V. M. (2010) Investigation of bacterial diversity in membrane bioreactor and conventional activated sludge processes from petroleum refineries using phylogenetic and statistical approaches. J. Microbiol. Biotechnol., 20(3), 447-459.) with modifications.

A 4 mL aliquot of the sludge samples was washed with 10 mL of SET buffer and centrifuged for 10 minutes at 3,000 g. The washing procedure was performed five times. After washing, the sludge sample was suspended in 600 µL of SET buffer and homogenized in the tube shaker. Subsequently, lysozyme (GE Health Care®) was added (50 µL of a 100 mg/mL solution), and the solution was incubated in a water bath at 37° C., with agitation every 10 minutes. Then, proteinase K (Sigma®) was added (50 µL of a 10 mg/mL solution) and 200 µL of 10% SDS (Cf=2%), the solution was incubated at 60° C. for 30 minutes, with agitation every 10 minutes. The sample was then subjected to three "freeze-thaw" cycles, 2 minutes in liquid nitrogen and 2 minutes at 65° C. Afterwards, an equal volume of saturated phenol pH 8.0 was added to the solution, homogenized for 2 minutes and centrifuged at 10,000 g for 5 minutes. The supernatant was collected, an equal volume of chloroform-isoamyl alcohol (24:1) was added and centrifuged at 10,000 g for 5 minutes. Again, the supernatant was collected, and a 5M NaCl solution (10% of the total volume) was added to the same, followed by the addition of 2 volumes of cold absolute ethanol. The microtube was centrifuged for 20 minutes at 10,000 g. The pellet was washed with 70% ethanol and after drying, eluted in 25 µL of H2O-Milli-Q.

The genomic DNA of the two samples was sent to NGS (Next Generation Sequencing) of the variable region V1-V2 and V3 of the 16S rRNA gene, using the 27f/338r primer, at Molecular Research DNA (www.mrdnalab.com, Shallowater, TX, USA) by the MiSeq platform (Illumina). Sequence data were processed using the MR DNA analysis pipeline (MR DNA, Shallowater, TX, USA). Barcodes were removed, sequences smaller than 150 bp and chimeras were removed. The contigs were assembled and an OTU (Operational Taxonomic Unit) file was generated. OTUs were defined by grouping at 3% divergence. A representative sequence from each OTU was taxonomically classified using BLASTn against a curated database derived from GreenGenes, RDPII, and NCBI (www.ncbi.nlm.nih.gov, DeSantis et al. 2006, http://rdp.cme.msu.edu). The diversity indices were obtained using the PAST (Paleontological Statistics Software Package for education and data analysis) software (Hammer, Ø., Harper, D. A. T., Ryan, P. D. (2001) Past: Paleontological statistics software package for education and data analysis. Palaeontol. Electron., 4(1), 9).

C) Evaluation of Ammonia Removal

To evaluate the performance of ammoniacal nitrogen removal in the reactors, the following parameters were monitored and evaluated: COD, TOC, CI, ammoniacal nitrogen, nitrite, nitrate, total nitrogen, phosphorus, total suspended solids, volatile suspended solids, pH, alkalinity and conductivity.

The COD, ammoniacal nitrogen, nitrite, nitrate, total nitrogen and phosphorus procedures were performed using the TNT Plus Hack Kit, the others were performed following the standard procedures of the "Standard Methods for the Examination of Water and Wastewater" (APHA, 2005).

Although preferred embodiments of the present invention have been demonstrated throughout this specification, it will be obvious to a technician skilled on the subject that these embodiments are provided by way of example only. Several variations, alterations and substitutions will occur to those skilled in the art without departing from the invention. Accordingly, it is expected that the following claims define the scope of the invention, encompassing its possible equivalents.

The invention claimed is:

1. A method for removing ammoniacal nitrogen from hypersaline effluents through a consortium containing high-salinity-resistant heterotrophic nitrifying and aerobic denitrifying microorganisms, the method comprising:

a) supplying an activated sludge from an effluent treatment plant for an effluent;

b) providing a hypersaline aqueous effluent with salinity similar to the activated sludge from the effluent treatment plant;

c) inoculating a reactor with the aforementioned activated sludge of item (a) and the hypersaline aqueous effluent of item (b) in a proportion ranging from 70:30 to 50:50;

d) feeding and aerating the activated sludge for 4 hours, aerating for 3 hours, allowing to settle for 1 hour and discarding a supernatant for 4 hours;

e) discarding 30% of the supernatant and completing a volume of the reactor with the effluent of item (b);

f) weekly increasing the salinity of the effluent of item (b) with an addition of NaCl in a range of 5 g/L until a desired salinity between 100 and 200 g/L is reached, provided that there is no inhibition of nitrification, that is, a residual ammoniacal nitrogen is less than 20 mg/L;

g) at salinities lower than 100 g/L, adding a source of carbon to the effluent of item (b) in order to ensure a minimum ratio of $COD:NH_4^+$ from 20:1 to 40:1; or, at salinities greater than 100 g/L, maintaining a C:N ratio, measured as Total Organic Carbon $(TOC)/NH_4^+$, between 4 and 7; and h) maintaining a phosphorus source at a minimum $NH_4^+/P$ ratio of about 5;

wherein an alkalinity of the effluent of item (b) is maintained above 900 mg/L, a pH of the effluent of item (b) is maintained between 6.5 and 7.5 and a temperature of the effluent of item (b) is maintained between 27 and 33° C.

2. The method according to claim 1, wherein the activated sludge comes from a production water treatment plant derived from oil exploration.

3. The method of claim 1, wherein the effluent of item (b) is production water derived from oil exploration.

4. The method of claim 1, wherein the source of carbon is ethanol and the phosphorus source is sodium tripolyphosphate.

5. The method of claim 1, the salinity of the effluent of item (b) is greater than or equal to 50 g/L.

6. The method of claim 1, wherein the temperature of the effluent of item (b) is maintained at about 30° C.

7. The method of claim 1, wherein the pH of the effluent of item (b) is maintained at about 7.

* * * * *